United States Patent Office 3,270,097
Patented August 30, 1966

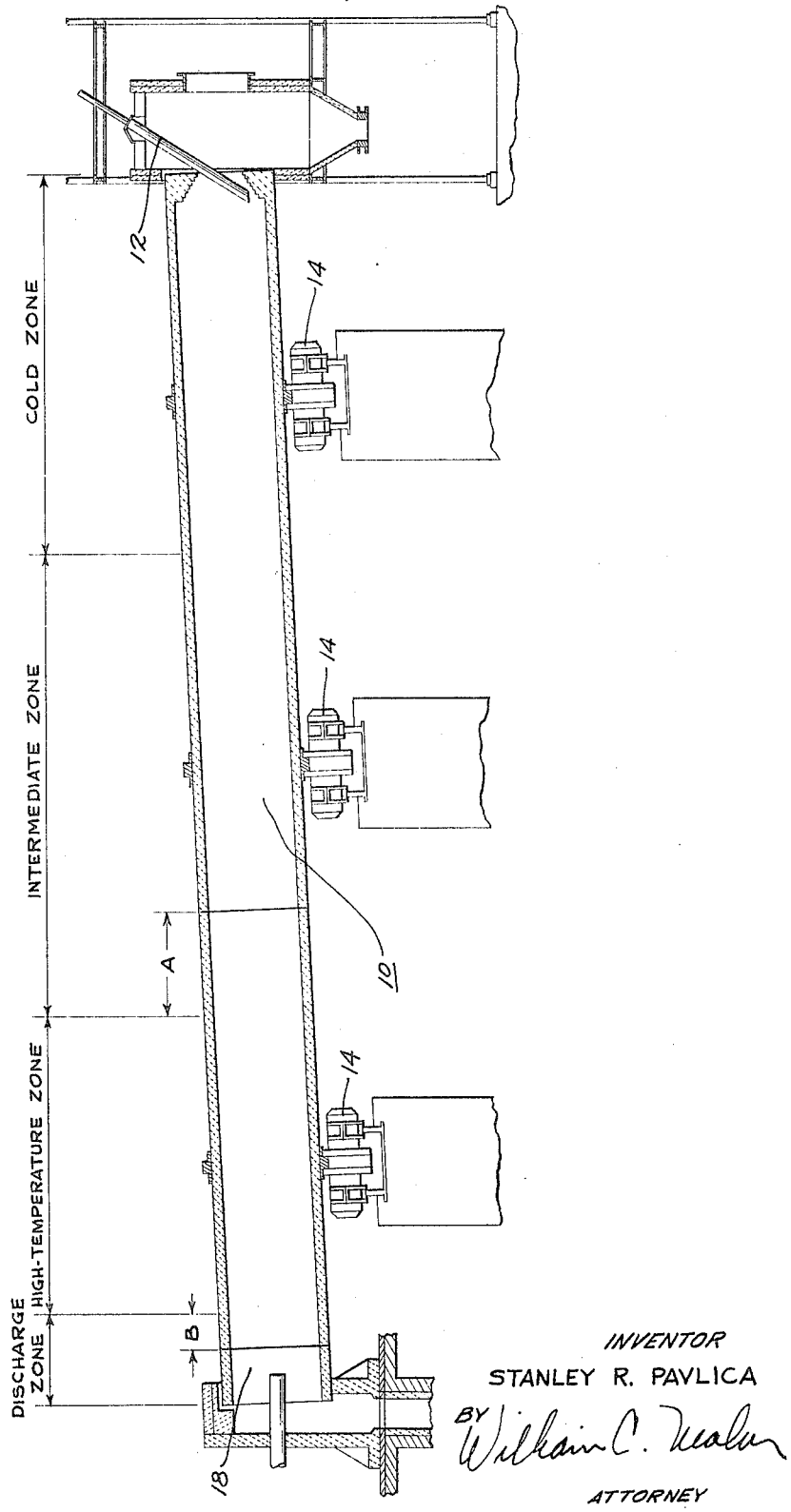

3,270,097
METHOD OF LINING A ROTARY KILN
Stanley R. Pavlica, Brackenridge, Pa., assignor to Harbison-Walker Refractories Company, Pittsburgh, Pa., a corporation of Pennsylvania
Filed Mar. 20, 1964, Ser. No. 353,540
6 Claims. (Cl. 263—52)

The present invention relates to lining a rotary kiln having an unburned, high temperature refractory brick lining therefor.

In contemporary rotary kilns, and other environments subjected to similar or analogous operating conditions, such as hot metal transfer ladles and metal mixers, a wide diversity of uses and increasingly rigorous conditions, imposed by high operating temperatures and/or greater chemical activity of materials in contact with linings, has necessitated the use of refractories not heretofore available or economically feasible.

For example, modern day rotary kilns are used for producing cement clinker, lime, and calcined dolomite. Thousands of these kilns are in operation throughout the world. Rotary kilns are also used in the processing or manufacture of phosphates, alumina, magnesia, titania, zirconia, carbon or coke, manganese dioxide, lightweight aggregates and ores of iron, chromium, lithium and uranium; for calcining clay and bauxite, reduction of some metals, the burning of sulfur, etc. The temperatures reached in the high temperature zone of the kiln range up to 2900° F. and sometimes as high as 3200° F.

One of the problems that has arisen is that the charged materials, for instance, cement and lime, become pasty just before entering the high temperature or firing zone. Thus, a temporary coating of the charge material tends to build up adjacent the hot zone. That is, a coating builds up for a short period of time and then flakes off the walls of the kiln and deposits itself in the firing zone which disrupts the uniform flow of charge material. Other materials such as alumina, magnesia, and zirconia, adhere permanently in the area adjacent the hot zone and form a ring around the inner periphery of the kiln which impedes the continuous flow of the charge material. The kiln may have to be shut down and the ring coating removed by shot blasting and the like.

Accordingly, it is an object of the present invention to provide method of lining a rotary kiln with a novel, unburned, high temperature refractory brick that is substantially nonwettable by charge materials in the kiln.

Another object of the invention is to provide, method of lining a rotary kiln or the like with an unburned refractory brick or relatively high density, mechanical strength, and abrasion resistance.

Other objects of the invention will appear hereinafter.

In order to more fully understand the nature and scope of the invention, reference should be had to the following detailed description and drawing, the single figure of which is a longitudinal section of a typical rotary kiln.

Briefly, in accordance with an embodiment, the present invention comprises a rotary kiln having a high temperature zone, preceded by a preheating zone and followed by a discharge zone. Other zones may be present in the kiln depending on design requirements or preferences. At least a portion of the zone preceding and that zone following the high temperature zone, immediately adjacent said high temperature zone, are lined with special unburned, high temperature refractory brick. These brick are made from a batch consisting of from 60 to 65%, by weight, of calcined South American bauxite, the balance flint clay. The batch is bonded into brick with concentrated phosphoric acid in an amount to provide $P_2O_5$ equivalent to that provided by about 3 to 5% of 85% phosphoric acid.

The flint clay may be either crude or calcined. However, a mixture of the two is preferred. Accordingly, the mixture contains about from 20 to 25%, by weight, of calcined flint fire clay, and from about 10 to 15% of crude flint clay. About 30 to 35% of bauxite is added as ball mill fines (−65 mesh) of which about 60 to 70% passes a 150 mesh screen (−150 mesh). A typical analysis of the bauxite material is as follows: about 89% $Al_2O_3$, about 6.2% $SiO_2$, about 3.1% $TiO_2$, about 1.5% $Fe_2O_3$, the remainder—alkalies and trace impurities. The analysis of suitable clay appears later.

In practice the brick are formed simply and economically as follows. The above named components are size graded and combined as a batch to which is added from about 3 to 5%, by weight, of 85% phosphoric acid and from 1 to 3%, by weight, of a tempering agent, such as, water. Other tempering agents, for instance, sulfite waste liquor, may also be used. The batch ingredients are blender in a mixer, such as a Simpson or Clearfield mixer, to a brickmaking consistency. The batch is compressed in a brickmaking press at a pressure in the range about 3000 to 8000 p.s.i. The resulting brick are cured at a temperature of about 450 to 600° F.

It is known in the art that bauxitic materials, as mined, are generally inert with respect to reaction with phosphoric acid. However, by specifically size grading the bauxite material so that a suitable proportion of it passes a 150 mesh screen, that proportion reacts with phosphoric acid to form aluminum phosphate which binds coarser particles when pressed shapes made therefrom are subsequently cured at an elevated temperature. About 15 to 25% of a −150 mesh bauxite fraction is considered adequate for the purposes of the invention.

Referring to the figure, there is shown a rotary kiln 10 having in sequence, a cold zone, intermediate zone, high temperature zone, and discharge zone. The charge material is fed through a conduit 12 and systematically passes through each of the zones at a rate depending upon the slope of the kiln and the speed at which the kiln is turned or rotated by rollers 14. As the charge material passes through the intermediate zone, it tends to become tacky or sticky especially within that portion of the intermediate zone designated A adjacent the high temperature zone. Also, the material again tends to become tacky and sticky after passing from the high temperature zone and into the discharge zone, particularly within that portion designated B of said latter zone. It is in these areas designated A and B that the brick composition of the present invention is employed. As these brick are nonwettable by refractory materials, metals, and slag, the coating rings formed heretofore have been eliminated. The remainder of the discharge zone lining and the cold zone lining may be composed of fireclay brick. The remainder of the intermediate zone lining may be composed of high alumina (70%+) brick and the firing zone lining may be composed of burned forsterite brick.

The following examples are illustrative of the practice of this invention. All parts and percentages are weight. All chemical analyses are on the basis of an oxide analysis, in conformity with the general practice of reporting the chemical analyses of materials. All size grading or mesh indications are according to the standard (Tyler) series. Of course, all size gradings and chemical analyses should be considered but typical.

*Example 1*

About 62% of −4 mesh calcined South American bauxite (32% was ball mill fines of which 65% passed a 150 mesh screen), about 23% of calcined flint fire clay, and about 15% of crude flint clay were intimately mixed in a Simpson mixer for two minutes. About 3.5% of 85% phosphoric acid and about 2.5% of water were added to the batch which then was mixed for 8 minutes. The resulting batch mixture was formed into shapes on a power press at a pressure of 5,000 p.s.i. The resulting shapes were dried at 250° F. and then cured at 600° F. After curing, the shapes had an average density of 170 p.c.f., an average modulus of rupture of 1200 p.s.i., and an average compressive strength of 8350 p.s.i.

The calcined flint employed was −4 +65 mesh and analyzed typically about 55% $SiO_2$, about 35% $Al_2O_3$, about 2% $TiO_2$, about 2% $Fe_2O_3$, the remainder being CaO, MgO and alkalies. The crude flint clay employed was substantially all −100 mesh and analyzed about 50% $SiO_2$, about 35% $Al_2O_3$, about 2% $TiO_2$, about 2% $Fe_2O_3$, the remainder being CaO, MgO and alkalies with about a 10% ignition loss. The overall size grading of the batch was typically as follows: −4 on 10 mesh—about 10%, −10 on 28 mesh—about 20%, −28 on 65 mesh—about 25%; pass 150 mesh—about 45%.

The brick are employed to line the interior of the intermediate and discharge zones at the portions designated A and B. The fired portions A and B are not coated by refractory charge materials, molten metals, and slags.

*Example II*

Another batch was prepared identical in all respects to the batch in Example I except that 5% of 85% of phosphoric acid and 1% water were added to a Simpson mixer. Identical techniques were used in mixing the ingredients and fabricating the brick. After curing, the resulting shapes had a density of 170 p.c.f., a modulus of rupture of 1230 p.s.i., and a compressive strength of 8600 p.s.i. The brick are employed in the zones specified in Example I with similar success.

It can be observed from the above examples that the strength of the brick of the invention is relatively high. It is well known in the refractory art that the strength of refractory bodies bear a fairly direct relation to abrasion resistance. Modulus of rupture is a standard test in refractory studies. It is determined with simple apparatus, exhibits a good degree of precision, and gives an excellent measure of bonding strength. Its determination is often made in lieu of abrasion testing which required much more elaborate equipment. Thus, an empirical degree of abrasion resistance can be construed from this test. The abrasion resistance of the present rotary kiln lining is relatively high compared to prior linings.

It is intended that the foregoing description and drawing be construed as illustrative and not in limitation of the invention.

Having thus described the invention in detail and with sufficient particularity as to enable those skilled in the art to practice it, what is desired to have protected by Letters Patent is set forth in the following claims:

I claim:

1. A method for forming an unburned, high temperature refractory lining in a rotary kiln which is substantially nonwettable by charge materials in the kiln and in which, said kiln contains an outer metal shell and has a high temperature zone and at least one other temperature zone, comprising forming a batch consisting essentially of, by weight, from about 60 to 65% of calcined South American bauxite, from about 20 to 25% of calcined flint fire clay, from about 10 to 15% of crude flint clay, mixing the batch with concentrated phosphoric acid in an amount to provide $P_2O_5$ equivalent to that provided by about 3 to 5% of 85% phosphoric acid, compressing the batch to form self-sustaining refractory shapes, curing the resulting shapes at a temperature of about 450 to 600° F. and disposing the shapes along the inner periphery of the metal shell within at least a portion of said other zone immediately adjacent the high temperature zone.

2. A method for forming an unburned, abrasion resistant, high temperature refractory lining in a rotary kiln which is substantially nonwettable by refractory materials, metals, and slag in which, said kiln contains an outer metal shell and has in sequence a cold temperature zone, intermediate temperature zone, high temperature zone and discharge zone, comprising forming a batch consisting essentially of, by weight, from about 60 to 65% of calcined South American bauxite, from about 20 to 25% calcined flint fire clay, from about 10 to 15% of crude flint clay, mixing the batch with concentrated phosphoric acid in an amount to provide $P_2O_5$ equivalent to that provided by about 3 to 5% of 85% phosphoric acid, compressing the batch to form self-sustaining refractory shapes, curing the resulting shapes at a temperature of about 450 to 600° F. and disposing the shapes along the inner periphery of the metal shell within at least a portion of the intermediate zone and the discharge zone immediately adjacent the high temperature zone.

3. The method of claim 2 in which from 30 to 35% of the bauxite is added as ball mill fines of which 60 to 70% is −150 mesh.

4. The method of claim 2 in which the batch is compressed at a pressure from 3000 to 8000 p.s.i.

5. A method for forming an unburned, nonwettable, high temperature refractory lining in a rotary kiln containing an outer metal shell and having a high temperature zone and at least one other temperature zone, comprising forming a batch consisting essentially of, by weight, from about 60 to 65% of calcined South American bauxite and the balance substantially all flint fire clay, mixing the batch with concentrated phosphoric acid in an amount to provide $P_2O_5$ equivalent to that provided by about 3 to 5% of 85% phosphoric acid, compressing the batch to form self-sustaining refractory shapes, curing the resulting shapes at a temperature of about 450 to 600° F. and disposing the shapes along the inner periphery of the metal shell within at least a portion of said other zone immediately adjacent the high temperature zone.

6. A method for forming an unburned, abrasion resistant high temperataure refractory lining in a rotary kiln containing an outer metal shell and having a high temperature zone and at least one other temperature zone, said lining being substantially nonwettable by charge materials in a kiln, comprising forming a batch consisting essentially of, by weight, from about 60 to 65% of calcined South American bauxite, in which from 30 to 35% is added as ball mill fines of which 60 to 70% is −150 mesh, from about 20 to 25% of −4 +65 mesh calcined flint fire clay and from about 10 to 15% of −100 mesh crude flint clay, mixing the batch with concentrated phosphoric acid in an amount to provide $P_2O_5$ equivalent to that provided by about 3 to 5% of 85% phosphoric acid, compressing the batch to form self-sustaining shapes, curing the resulting shapes at a temperature of from about 450 to 600° F. and disposing the shapes along the inner periphery of the metal shell within at least a portion of said other zone immediately adjacent the high temperature zone.

References Cited by the Examiner

UNITED STATES PATENTS

| | | | |
|---|---|---|---|
| 775,887 | 11/1904 | Berger | 266—43 X |
| 2,220,701 | 11/1940 | Benner et al. | 263—33 |
| 2,992,930 | 7/1961 | Wheeler et al. | |

FREDERICK L. MATTESON, JR, *Primary Examiner.*

JOHN J. CAMBY, *Assistant Examiner.*